United States Patent
Richardson

(10) Patent No.: US 7,195,260 B2
(45) Date of Patent: Mar. 27, 2007

(54) STEER AXLE SUSPENSION

(75) Inventor: Gregory Richardson, Muskegon, MI (US)

(73) Assignee: Dana Corporation, Toledo, OH (US)

( * ) Notice: Subject to any disclaimer, the term of this patent is extended or adjusted under 35 U.S.C. 154(b) by 400 days.

(21) Appl. No.: 10/677,760

(22) Filed: Oct. 2, 2003

(65) Prior Publication Data
US 2004/0104553 A1 Jun. 3, 2004

Related U.S. Application Data

(60) Provisional application No. 60/415,637, filed on Oct. 2, 2002.

(51) Int. Cl.
*B60G 3/16* (2006.01)
*B60G 11/46* (2006.01)

(52) U.S. Cl. .................. 280/124.128; 280/124.163; 280/124.17

(58) Field of Classification Search ......... 280/124.123, 280/124.125, 124.127, 124.128, 124.132, 280/124.134, 124.163, 124.17; 267/260, 267/262, 196
See application file for complete search history.

(56) References Cited

U.S. PATENT DOCUMENTS

| | | | | |
|---|---|---|---|---|
| 3,897,844 | A | | 8/1975 | Chevalier |
| 4,273,357 | A | * | 6/1981 | Pashkow ............. 280/124.116 |
| 5,401,049 | A | | 3/1995 | Richardson |
| 5,560,641 | A | * | 10/1996 | Vogler ................. 280/124.163 |
| 6,073,947 | A | * | 6/2000 | Gottschalk et al. ... 280/124.128 |
| 6,394,474 | B1 | | 5/2002 | Warinner et al. |
| 6,454,283 | B1 | * | 9/2002 | Fenton ................ 280/124.163 |
| 6,485,040 | B1 | * | 11/2002 | Dudding ............. 280/124.175 |
| 6,607,206 | B2 | | 8/2003 | Petit |
| 6,851,689 | B2 | * | 2/2005 | Dudding et al. ...... 280/124.128 |
| 2001/0052685 | A1 | * | 12/2001 | Svartz et al. ......... 280/124.116 |

OTHER PUBLICATIONS

International Search Report for PCT/US03/31087, International Search Authority, 5 pages (Apr. 13, 2004).

* cited by examiner

*Primary Examiner*—Paul N. Dickson
*Assistant Examiner*—Laura B. Rosenberg
(74) *Attorney, Agent, or Firm*—Dykema Gossett PLLC

(57) ABSTRACT

A suspension for coupling a steer axle assembly to a vehicle frame is provided that provides lateral stability to the steer axle assembly without the use of a track rod or stabilizer bar. The suspension includes a body that is coupled to the axle beam of the steer axle assembly. An arm extends from the body in the longitudinal direction of the vehicle and is coupled to the frame at one end. The arm is pivotable about an axis extending generally transversely to the frame rails of the vehicle frame. A male guide member is connected to the body and is received within a female guide member that is in turn disposed in an aperture defined by a bracket of the frame. The guide members are free to move within the bracket vertically or in the fore-aft direction, but are restricted from lateral movement.

15 Claims, 5 Drawing Sheets

STEER AXLE SUSPENSION

BACKGROUND OF THE INVENTION

This application claims priority to pending U.S. Provisional Patent Application Ser. No. 60/415,637 filed on Oct. 2, 2002, the entire disclosure of which is incorporated herein by reference.

1. Field of the Invention

This invention relates to vehicle suspensions and, in particular, to a front suspension for coupling a steer axle assembly to a vehicle frame.

2. Discussion of Related Art

A conventional vehicle includes a vehicle frame having a pair of longitudinally extending frame rails that support the vehicle engine and body. The frame is supported on a plurality of ground-engaging wheels that are disposed at opposite ends of a plurality of axles. The vehicle may contain, for example, a steer axle on which the wheels are steerable by the vehicle operator and a drive axle whose wheels are driven by the vehicle engine. Each of the axles are coupled to the vehicle frame through a suspension that dampens movements transmitted between the wheels and the vehicle frame.

Conventional vehicle suspensions must account for lateral movement of an axle and offer a degree of lateral stability. One typical means for providing lateral stability is to use a track or stabilizer bar coupled between the frame and a component of the axle or suspension. The bar extends transversely across the frame. It is difficult, however, to use a track bar to provide lateral stability to a steer axle. In particular, the steer axle is typically disposed proximate the vehicle engine and the engine interferes with potential locations for the track bar.

The inventors herein have recognized a need for a suspension for coupling a steer axle assembly to a vehicle frame that will minimize and/or eliminate one or more of the above-identified deficiencies.

SUMMARY OF THE INVENTION

The present invention provides a suspension for coupling a steer axle assembly to a vehicle frame having first and second longitudinal frame rails.

A suspension in accordance with the present invention includes a body coupled to an axle beam of the steer axle assembly and an arm that extends from the body. The arm is coupled to the vehicle frame at one end and is pivotable about a pivot axis disposed proximate the one end and extending transversely to the first and second longitudinal frame rails of the vehicle frame. In one embodiment of the invention, this arm comprises a leaf spring that extends forward from the body and is pivotally coupled to the frame. The suspension further includes a guide member connected to the body and received within an aperture defined by a bracket of the frame. The aperture is configured to limit lateral movement of the guide member and the axle beam relative to the first and second longitudinal frame rails, but allow vertical movement of the guide member and the axle beam relative to the first and second longitudinal frame rails. In one embodiment of the invention, the guide member is defined by a second arm that extends from the body into the aperture in the bracket in a substantially opposite direction from the first arm. In another embodiment of the invention, the guide member extends through the aperture in the bracket and is held between two legs extending from the body that are disposed on opposite side of the bracket. In one embodiment of the invention, the guide member comprises a male guide member that is received within an opening of a female guide member that is in turn disposed within the aperture of the bracket.

A suspension in accordance with the present invention is advantageous. The suspension provides lateral stability to the steer axle while avoiding potential interference with the engine or other vehicle components.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
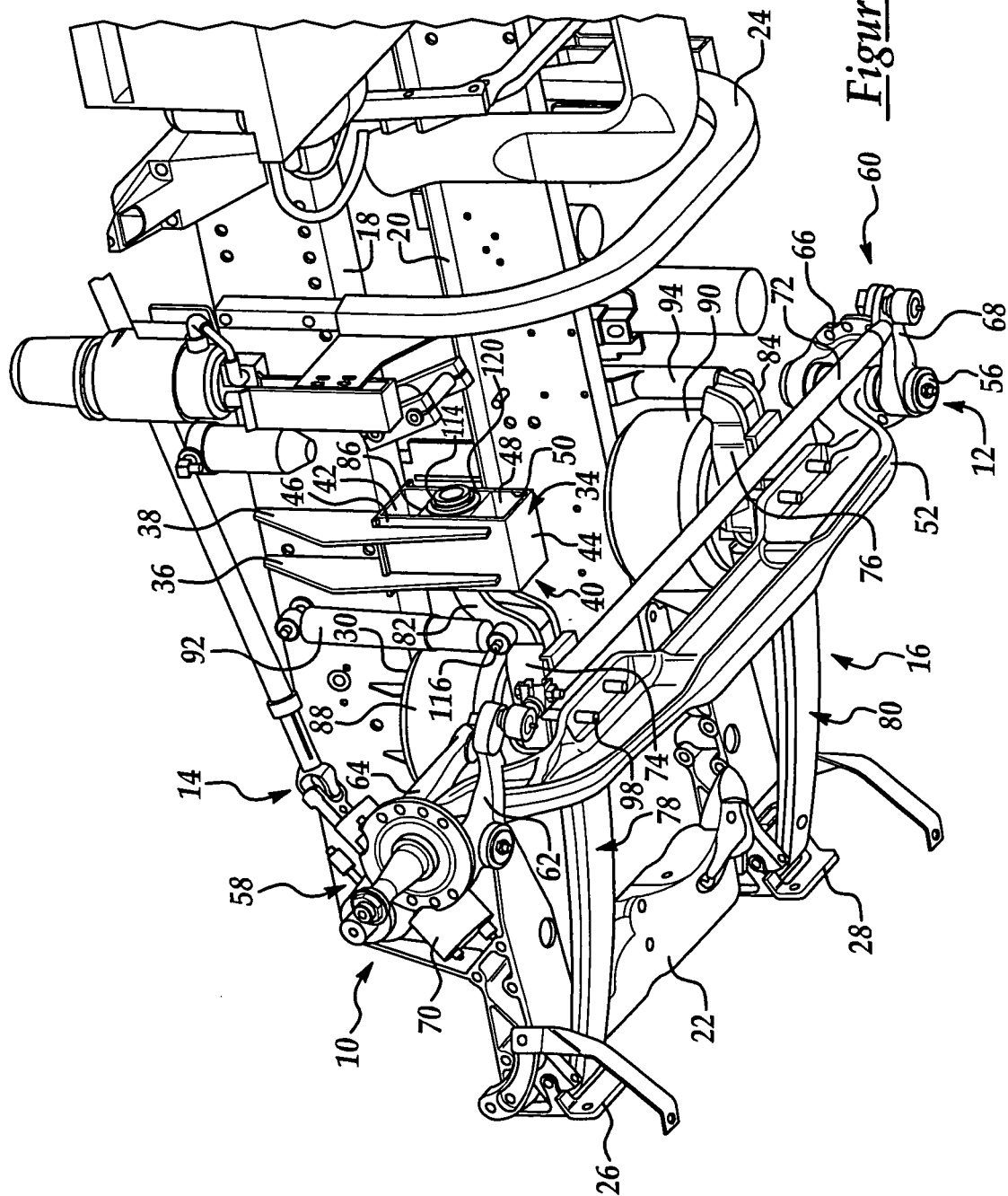
FIGS. 1 and 2 are perspective views illustrating a portion of a vehicle incorporating a suspension in accordance with one embodiment of the present invention for coupling a steer axle assembly to a frame of the vehicle.
Figure 2:
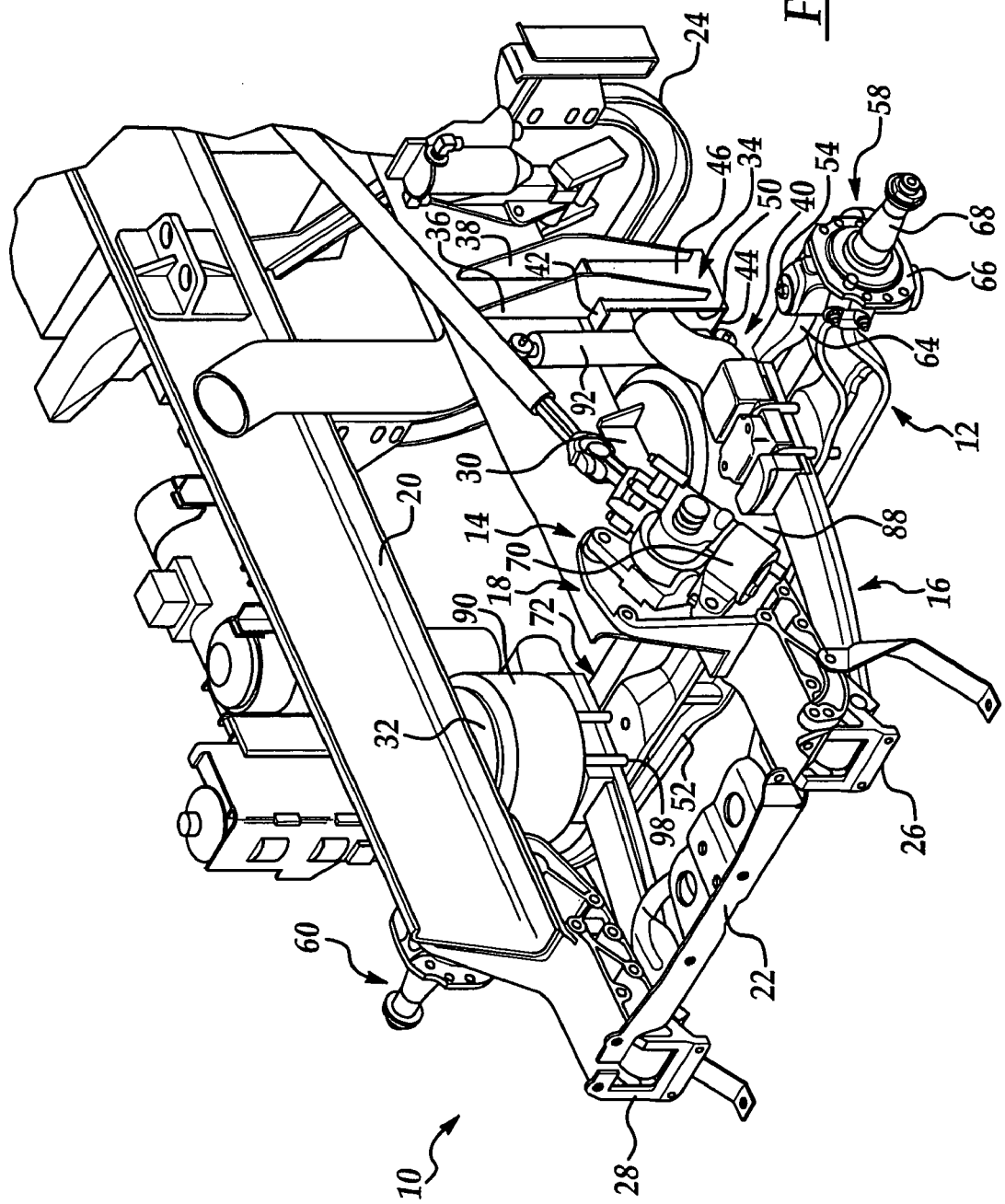

Referring now to the drawings wherein like reference numerals are used to identify identical components in the various views, FIGS. 1 and 2 illustrate a vehicle frame 10 having a steer axle assembly 12 coupled thereto by a steering assembly 14 and a suspension 16 in accordance with the present invention. In the illustrated embodiment, frame 10 and steer axle assembly 12 are adapted for use with a heavy truck. It should be understood, however, that the present invention may find application on a wide variety of vehicles.

Frame 10 is provided to support an engine (not shown), cab (not shown) and other components of a heavy truck. Frame 10 is conventional in the art and may be made from conventional metals and metal alloys such as steel. Frame 10 includes a pair of longitudinal rails 18, 20 extending in the direction of vehicle travel and in the longitudinal direction of the vehicle. Frame 10 may also include a plurality of cross-members 22, 24 extending transversely between rails 18, 20 and a plurality of mounting brackets including brackets 26, 28, 30, 32, 34.

Rails 18, 20 are provided to secure and align a cab on frame 10 and are conventional in the art. Rails 18, 20 are generally C-shaped in cross-section and open toward one another. Rails 18, 20 may include a plurality of apertures configured to receive bolts, screws, or other fasteners used to secure cross members 22, 24 and mounting brackets 26, 28, 30, 32, 34.

Cross-members 22, 24 are provided to connect rails 18, 20 and are conventional in the art. Cross-members 22, 24 may also support various vehicle components including the cab and the vehicle engine Mounting brackets 26, 28, 30, 32, 34 are provided to couple components of suspension 16 to frame 10 and are coupled to frame 10 using conventional fasteners such as screws, bolts, welds, or adhesives. Brackets 26, 28 are connected to cross-member 22 on either side of frame 10. Each of brackets 26, 28 define a pair of rearwardly extending spaced ears having aligned apertures for a purpose described hereinbelow. Brackets 30, 32 are connected to rails 18, 20, respectively. Each of brackets 30, 32 may include a circular plate defining a spring seat for a purpose described hereinbelow.

Bracket 34 may be connected to either of rails 18, 20 and is connected to rail 18 in the illustrated embodiment. Although only one bracket 34 is shown in the illustrated embodiment, bracket 34 may be replicated and connected to each of rails 18, 20. Bracket 34 includes a pair of baffles 36, 38 and a box 40. Baffles 36, 38 are substantially triangular in shape and are coupled to an outboard side of rail 18 and to box 40 by welds or other conventional means. Box 40 is substantially rectangular in shape having top, bottom and side walls 42, 44, 46, 48. Box 40 may be disposed rearwardly on one side of axel beam 52. Top wall 42 and side wall 46 may be coupled to baffles 36, 38. Top wall 42 may also be coupled to rail 18. Although walls 42, 44, 46, 48 are continuous in the illustrated embodiment, it should be understood that breaks in one or more walls 42, 44, 46, 48 are possible and that walls 42, 44, 46, 48 may also define one or more openings. Box 40 is open at its forward and rearward ends thereby defining an aperture 50 for a purpose described hereinbelow. It should be understood that the size, shape, and configuration of brackets 26, 28, 30, 32, 34 will vary depending upon design requirements and parameters associated with frame 10, steer axle assembly 12, steering assembly 14, and suspension 16 and that variations may be made to brackets 26, 28, 30, 32, 34 without departing from the scope of the present invention.

Steer axle assembly 12 supports one or more steerable wheels (not shown) disposed on either side of the vehicle. Assembly 12 may include an axle beam 52, kingpins 54, 56, and steering knuckles 58, 60.

Axle beam 52 supports wheels (not shown) disposed proximate either end of beam 52. Beam 52 may be made from conventional metals and metal alloys such as steel and may be forged or fabricated. Beam 52 extends transverse to rails 18, 20 and each end of beam 52 defines a bore that extends generally vertically and substantially perpendicular to the longitudinal axis of beam 52. Each bore is configured to receive a corresponding kingpin 54, 56.

Kingpins 54, 56 are provided to couple knuckles 58, 60 to beam 52. Kingpins 54, 56 may be made from steel or other conventional metals and metal alloys. Each kingpin 54, 56 may be fixed against rotation within a corresponding bore of axle beam 52 using one or more drawkeys as is conventional in the art. Kingpins 54, 56 are generally circular.

Knuckles 58, 60 are conventional in the art and are provided for mounting one or more wheels (not shown) of the vehicle and for connecting assembly 12 and steering assembly 14. Knuckles 58, 60 may be made from conventional metals such as aluminum and metal alloys such as steel and may be forged or fabricated. Each knuckle 58, 60 may include a body that defines a bore sized to receive a corresponding kingpin 54, 56 and bearings or a bushing surrounding the kingpin 54, 56 to allow the knuckles 58, 60 to rotate relative to kingpins 54, 56. Each knuckle 58, 60 includes a tie rod arm 62 (best shown in FIG. 2) and knuckle 58 further includes a steering arm 64 as is conventional in the art. Each knuckle 58, 60 may also include a brake mounting plate 66 and a spindle 68 (which may be integral with the knuckle body or coupled thereto) on which wheel bearings (not shown) and one or more wheels (not shown) are mounted.

Figure 3:
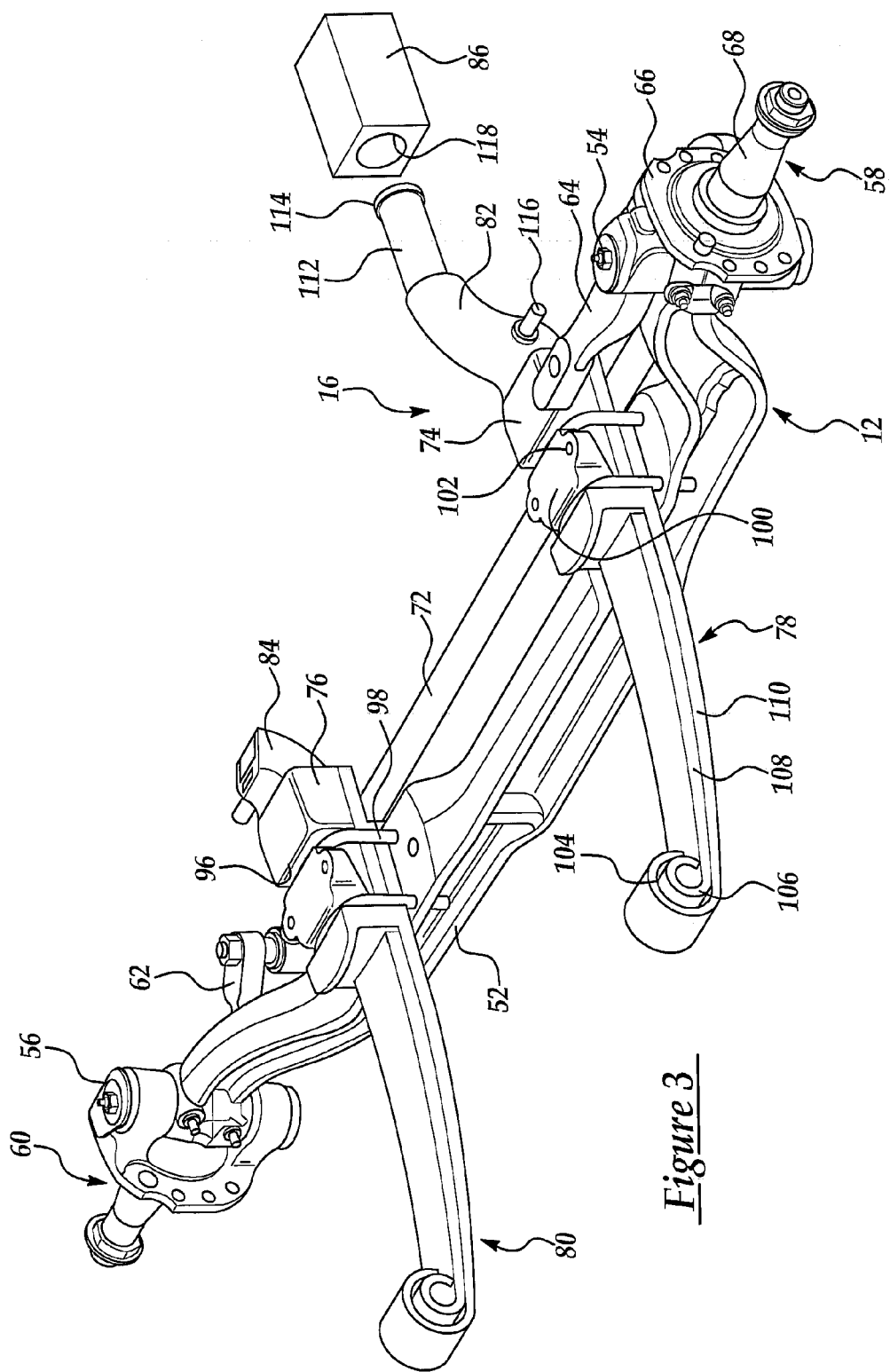
FIG. 3 is an enlarged perspective view of a portion of the suspension shown in FIGS. 1 and 2.

It should be understood that the steer axle assembly 12 described and illustrated in FIGS. 1–3 is exemplary only. The inventive suspension 16 claimed herein may find use on a wide variety of steer axle assemblies. In the steer axle assembly 12 of FIGS. 1–3, axle beam 52 is a conventional I-beam with a gooseneck configuration at either end. Further, each knuckle 58, 60 is a conventional yoke defining coaxial bores on either side of beam 52 for receiving kingpins 54, 56. Axle beam 52 may alternatively be tubular and/or relatively straight while each of knuckles 58, 60 define a single knuckle boss as described in greater detail in commonly assigned U.S. patent application Ser. No. 09/633,383, the entire disclosure of which is incorporated herein by reference.

Steering assembly 14 is provided to enable the vehicle operator to turn the wheels (not shown) supported on knuckles 58, 60. Steering assembly 14 is conventional in the art and includes a steering gear 70 coupled to cross-member 22, a crank (not shown) coupled to steering gear 70, a drag-link (not shown) extending between the crank and steering arm 64 of knuckle 58 and a tie rod 72 extending between tie-rod arms 62 of knuckles 58, 60. The crank rotates responsive to an output shaft extending from steering gear 70 and causes corresponding movement in the drag link, steering knuckle 58, tie-rod 72, and knuckle 60.

Referring now to FIG. 3, a suspension 16 in accordance with one embodiment of the present invention will be described. Suspension 16 couples steer axle assembly 12 to frame 10. Suspension 16 may include bodies 74, 76, arms 78, 80, 82, 84, a female guide member 86, springs 88, 90 and shock absorbers 92, 94.

Bodies 74, 76 provide a means for mounting or coupling suspension 16 to axle beam 52 and for supporting arms 78, 80, 82, 84 and springs 88, 90. Bodies 74, 76 are coupled to axle beam 52. Referring to FIG. 3, each of bodies 74, 76 may define one or more grooves 96. Grooves 96 extend substantially parallel to the longitudinal direction of axle beam 52 and each groove 96 is configured to receive a portion of a U-bolt 98, either end of which is received within apertures defined in axle beam 52 and secured thereto using nuts (not shown) in a conventional manner. In the illustrated embodiment, each of bodies 74, 76 includes two grooves 96. It should be understood, however, that the number of grooves 96 may vary. Each body 74, 76 may also define a spring seat 100 for a corresponding spring 88, 90. A pair of apertures 102 in each body 74,76 may be configured to receive fasteners associated with the corresponding spring 88, 90.

Arms 78, 80 provide a means for securing suspension 16 to frame 10. Arms 78, 80 extend from bodies 74, 76, respectively, on one side of axle beam 52 and substantially parallel to the longitudinal direction of the vehicle, frame 10, and rails 18, 20 of frame 10. Each arm 78, 80 defines an eye 104 at one end distant from axle beam 52 and a corresponding body 74, 76. Each eye 104 is sized to receive a bushing 106. Referring to FIGS. 1 and 2, the bushings 106 are configured to be received within the rearwardly extending ears of brackets 26, 28. In this manner, arms 78, 80 are coupled and pivotally connected to frame 10 and are able to pivot about an axis that extends substantially transverse to the longitudinal direction of the vehicle, frame 10, and rails 18, 20 of frame 10. In the illustrated embodiment, arms 78, 80 each include a pair of leaf springs 108, 110 disposed one on top of the other and extending under bodies 74, 76 to a point proximate the rearward side of axle beam 52. Leaf springs 108, 110 curve upwardly going forward such that arms 78, 80 are connected to frame 10 and brackets 26, 28 at a point vertically higher than axle beam 52. Bodies 74, 76 straddle at least the top leaf spring 108 in a corresponding arm 78, 80. It should be understood, however, that the illustrated embodiment is exemplary only. Arms 78, 80 may be constructed using a single leaf spring or more than two leaf springs. Further, arms 78, 80 may comprise conventional solid or tubular trailing arm structures. Arms 78, 80 may also be made integral with bodies 74, 76 such that bodies 74, 76 and arms 78, 80, respectively, form unitary or one-piece structures.

Arms 82, 84 provide a means for mounting shock absorbers 92, 94. Arm 82 is also used to provide lateral stability to axle assembly 12. Arms 82, 84 may be made integral with bodies 74, 76 such that bodies 74, 76 and arms 82, 84, respectively, form unitary or one-piece structures. Arms 82, 84 extend rearwardly from bodies 74, 76 in a substantially opposite direction from arms 78, 80 and substantially parallel to the longitudinal direction of the vehicle, frame 10, and rails 18, 20 of frame 10. Arms 82, 84 each curve upwardly moving rearwardly from bodies 74, 76. Arm 82 then curves downwardly forming an S or gooseneck shape. Arm 84 terminates after curving upwardly in the illustrated embodiment, but may be made identical to arm 82. Referring to FIGS. 1 and 2, a portion of each arm 82, 84 may be substantially C-shaped in cross-section with a top wall and two depending side walls. One end of arm 84 defines a rearwardly extending male guide member 112 for a purpose described hereinbelow. In the illustrated embodiment member 112 is round and tubular (i.e., cylindrical). It should be understood, however, that the size, shape, and configuration of member 112 may vary without departing from the scope of the present invention. Member 112 defines a groove around its circumference at a rearward end configured to receive a snap ring 114 for a purpose described hereinbelow. Each of arms 82, 84 may further include a rod 116 extending outboard from arms 82, 84. Referring to FIGS. 1 and 2, rod 116 fits within an eye of a corresponding shock absorber 92, 94. Rod 116 may be solid or tubular in construction.

Referring again to FIG. 3, female guide member 86 may also be used to provide lateral stability to axle assembly 12 in one embodiment of the invention. Member 86 may be made from a conventional plastic and particularly high density polyethylene. Member 86 may be substantially rectangular extending a greater distance in the longitudinal direction of the vehicle, frame 10, and rails 18, 20 of frame 10 than it does in a transverse or vertical direction. Member 86 may be substantially square in transverse cross-section. Member 86 is configured to be received within aperture 50 defined in box 40 of bracket 34. Member 86 is not secured to any of walls 42, 46, 48, 50 of box 40 and instead is freely movable within box 40. Member 86 defines an opening 118 configured to receive male guide member 112 on arm 82. Although opening 118 is round in the illustrated embodiment and therefore shaped to received male guide member 112, it should be understood that member 112 and opening 118 could be sized differently or have different shapes so long as the two are complementary to one another. The use of a round member 112 and opening 118, however, is advantageous because it allows some degree of relative rotation between the male and female guide members 112, 86. Movement of male guide member 112 in a forward direction within female guide member 86 is limited by snap ring 114 which may abut against a rear side of member 86 or, with reference to FIG. 1, against a washer 120.

The combination of male guide member 112 and female guide member 86, along with bracket 34, provides lateral stability to axle assembly 12. Movement of guide member 86, suspension 16, and axle assembly 12 in a transverse or lateral direction is limited by walls 46, 48 of bracket 34. Member 86, suspension 16 and axle assembly 12, however, are relatively free to move in the fore-aft direction because of the forward and rear openings in bracket 34 and in the vertical direction because of the spacing of top and bottom walls 42, 44 of bracket 34. Walls 42, 44 of bracket 34 can further be used to limit this vertical motion to a predetermined range. Although the illustrated embodiment uses both male and female guide members 112, 86, it should be understood that member 86 could be removed without departing from the spirit of the present invention. In this case, member 112 could, for example, be made larger and a wear material applied to either member 112 or walls 42, 44, 46, 48 of box 40 such that member 112 is received within aperture 50 and still limited in its lateral movement, but retains relative freedom of motion in the fore-aft and vertical directions as well as freedom to rotate within aperture 50.

Springs 88, 90 and shock absorbers 92, 94 are provided to dampen movements between steer axle assembly 12 and frame 10. Springs 88, 90 are conventional in the art and may comprise an air spring supported between opposed seats defined in bodies 74, 76 of suspension 16 and brackets 30, 32 on frame 10. Shock absorbers 92, 94 are also conventional in the art. Shock absorbers 92, 94 may include eyes at each end configured to receive rod or tubes such as rods 116 extending from arms 82, 84 of suspension 16 at a first end and rods extending outboard from frame rails 18, 20 at a second, opposite end.

Figure 4:
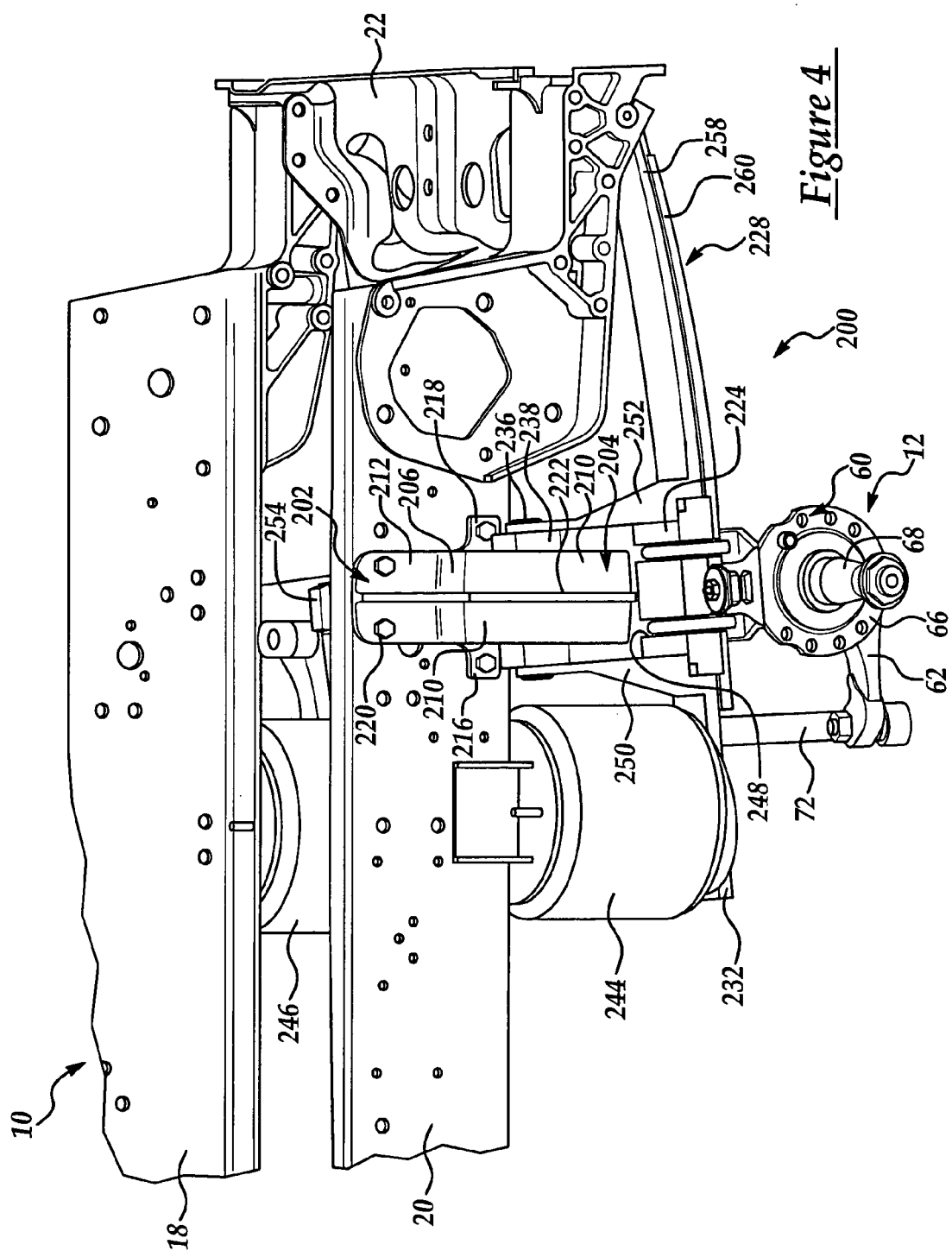
FIGS. 4–6 are perspective views illustrating a portion of a vehicle incorporating a suspension in accordance with another embodiment of the present invention for coupling a steer axle assembly to a frame of the vehicle.
Figure 5:
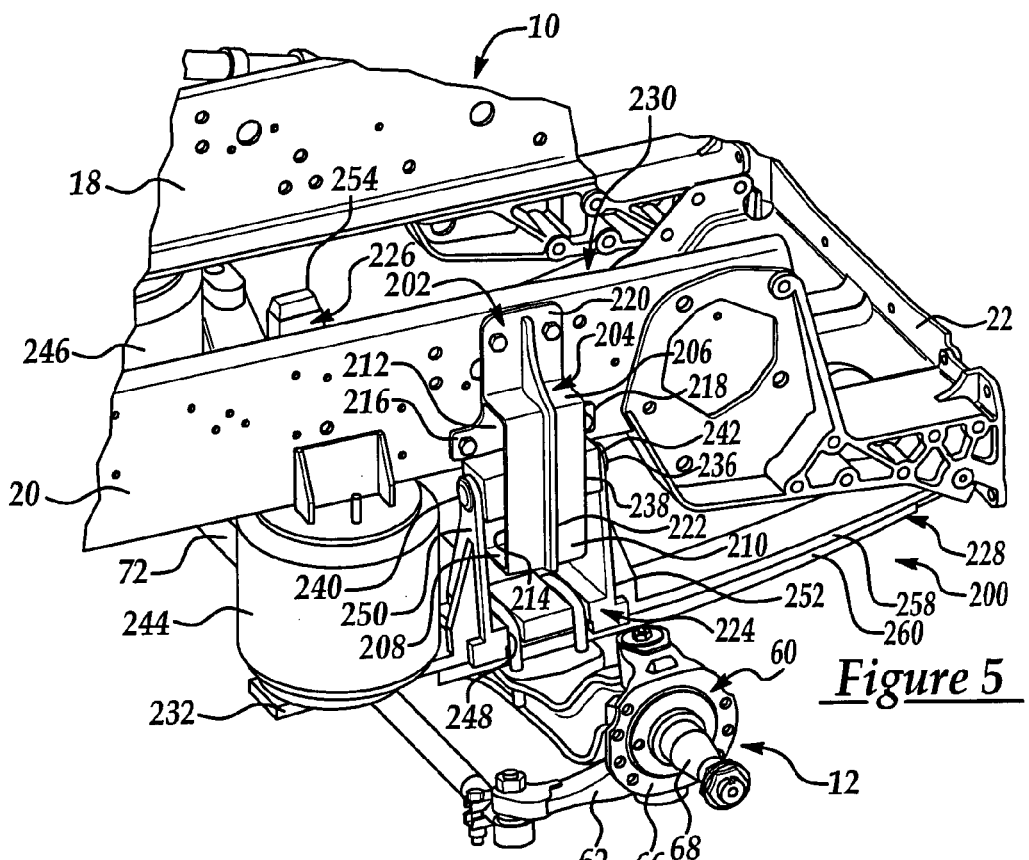
Figure 6:
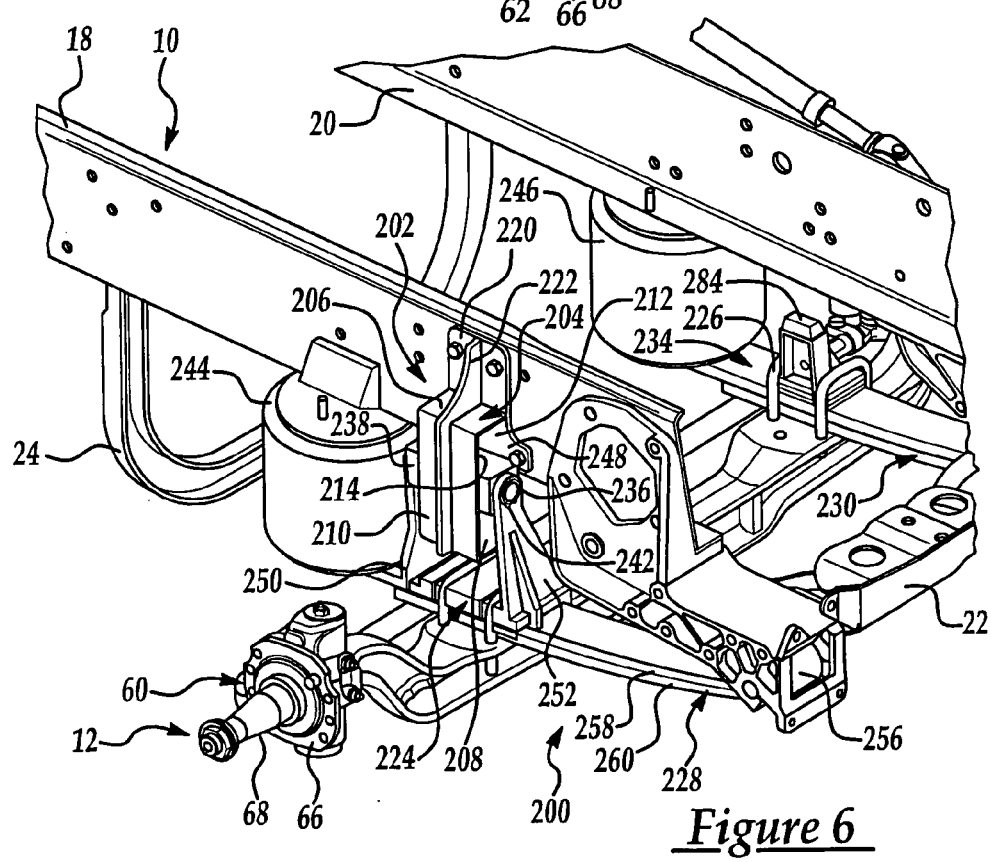

Referring now to FIGS. 4–6, a suspension 200 in accordance with another embodiment of the present invention will be described. Suspension 200 couples steer axle assembly 12 to frame 10. With the exception of mounting bracket 202, frame 10, steer axle assembly 12 and steering assembly 14 may be substantially the same as described hereinabove with reference to FIGS. 1–3 and therefore will not be described again in detail.

Bracket 202 may be connected to either of rails 18, 20 and is again connected to rail 18 in the illustrated embodiment. Although only one bracket 202 is shown in the illustrated embodiment, bracket 202 may be replicated and connected to each of rails 18, 20. Bracket 202 defines a box 204 having top, bottom, and side walls, 206, 208, 210, 212. Box 204 may be substantially rectangular in shape and is disposed outboard of frame rail 18. Box 204 extends vertically from a location intermediate the top and bottom of frame rail 18 to a location disposed below rail 18 and is disposed at least partially above axle beam 52. Box 202 is open at its forward and rearward ends thereby defining an aperture 214 for a purpose described hereinbelow. Top and bottom walls 206, 208 extend transverse to the longitudinal direction of the vehicle and are disposed outboard of frame rail 18. Side wall 210 extends vertically between walls 206, 208 and is outboard of side wall 212. Side wall 212 also extends vertically between walls 206, 208. Side wall 212 defines several mounting flanges 216, 218, 220 having apertures configured to receive fasteners that couple bracket 202 to frame rail 18. Side wall 212 may also include mounting flange or plate (not shown) that extends inboard and abuts the underside of rail 18 to increase the vertical rigidity of bracket 202. This mounting flange or plate may be coupled to rail 18 using conventional fasteners such as screws, bolts, pins, welds or adhesives. A baffle 222 may extend across portions of side wall 212, top wall 206 and side wall 210 for additional structural support. Although walls 206, 208, 210, 212 are continuous in the illustrated embodiment, it should again be understood that breaks in one or more walls 206, 208, 210, 212 are possible and that walls 206, 208, 210, 212 may define one or more openings. It should also understood that the sized, shape, and configuration of bracket 202 will vary depending upon design requirements and parameters associated with frame 10, steer axle assembly 12, steering assembly 14 and suspension 200 and that variations may be made to bracket 202 without departing from the scope of the present invention.

As set forth hereinabove, suspension 200 couples steer axle assembly 12 to frame 10. Suspension 200 may include bodies 224, 226, arms 228, 230, 232, 234, guide members 236, 238, means, such as snap rings 240, 242 for limiting fore-aft movement of guide member 236, and springs 244, 246.

Bodies 224, 226 provide a means for mounting or coupling suspension 200 to axle beam 52 and for supporting arms 228, 230, 232, 234. Bodies 224, 226 are coupled to axle beam 52. Each of bodies 224, 226 may define one or more grooves 248. Grooves 248 extend substantially parallel to the longitudinal direction of axle beam 52 and each groove 248 is configured to receive a portion of a U-bolt 98, either end of which is received within apertures defined in axle beam 52 and secured thereto using nuts (not shown) in a conventional manner. In the illustrated embodiment, each of bodies 224, 226 includes two grooves 248. It should be understood, however, that the number of grooves 248 may vary. Body 224 includes legs 250, 252 that extend vertically and are disposed on opposite sides of bracket 202. Legs 250, 252 are substantially triangular in shape and each form right triangles in the illustrated embodiment Baffles may extend in the fore and aft directions, respectively, from legs 250, 252, for additional structural support for body 224. Legs 250, 252 are configured to receive guide member 236 and, in particular, define coaxial aligned apertures through which guide member 236 extends. Body 226 defines a stop 254 designed to limit vertical displacement of axle beam 52 relative to frame rails 18, 20. It should be understood, however, that body 226 may alternatively be substantially the same as body 224.

Arms 228, 230 provide a means for securing suspension 200 to frame 10. Arms 228, 230 extend from bodies 224, 226, respectively, on one side of axle beam 52 and substantially parallel to the longitudinal direction of the vehicle, frame 10, and rails 18, 20 of frame 10. Each arm 228, 230 defines an eye 256 at one end distant from axle beam 52 and a corresponding body 224, 226. Each eye 256 is sized to receive a bushing (not shown). The bushings are configured to be received within the rearwardly extending ears of brackets 26, 28 of frame 10. In this manner, arms 228, 230 are coupled and pivotally connected to frame 10 and are able to pivot about an axis that extends substantially transverse to the longitudinal direction of the vehicle, frame 10, and rails 18, 20 of frame 10. In the illustrated embodiment, arms 228, 230 each include a pair of leaf springs 258, 260 disposed one on top of the other and extending under bodies 224, 226 to a point rearward of axle beam 52. Leaf springs 258, 260 curve upwardly going forward such that arms 228, 230 are connected to frame 10 and brackets 26, 28 at a point vertically higher than axle beam 52. Bodies 224, 226 straddle at least the top leaf spring 258 in a corresponding arm 228, 230. It should be understood, however, that the illustrated embodiment is exemplary only. Arms 228, 230 may be constructed using a single leaf spring or more than two leaf springs. Further, arms 228, 230 may comprise conventional solid or tubular trailing arm structures. Arms 228, 230 may also be made integral with bodies 224, 226 such that bodies 224, 226 and arms 228, 230, respectively, form unitary or one-piece structures.

Arms 232, 234 provide a means for mounting springs 244, 246. In the illustrated embodiment, arms 232, 234 comprise a rearward end of leaf spring 258. It should again be understood, however, that the illustrated embodiment is exemplary only and that arms 232, 234 may comprise conventional solid or tubular trailing arm structures. Arms 232, 234 extend rearwardly from bodies 224, 226 in a substantially opposite direction from arms 228, 230 and substantially parallel to the longitudinal direction of the vehicle, frame 10, and rails 18, 20 of frame 10. Arms 232, 234 define a spring seat and springs 244, 246 are disposed between opposed spring seats on arms 232, 234 and rails 18, 20, respectively.

Guide members 236, 238, together with bracket 202, provide a means for limiting lateral movement while permitting vertical movement of bodies 224, 226 and axle beam 52 relative to frame rails 18, 20. Guide member 236 may comprise a male guide member. In the illustrated embodiment member 236 is round and tubular (i.e., cylindrical). It should be understood, however, that the size, shape, and configuration of member 236 may vary without departing from the scope of the present invention. Member 236 extends through aperture 214 in box 204 of bracket 202 and also extends through the aligned apertures in legs 250, 252 of body 224 which support member 236. Member 236 may define circumferential grooves at its forward and rearward ends for a purpose described hereinbelow.

Guide member 238 may comprise a female guide member. Member 238 may be made from a conventional plastic and particularly high density polyethylene. Member 238 may be substantially rectangular extending a greater distance in the longitudinal direction of the vehicle, frame 10, and rails 18, 20 of frame 10 than it does in a transverse or vertical direction. Member 238 may be substantially square in transverse cross-section. Member 238 is configured to be received within aperture 214 defined in box 204 of bracket 202. Member 238 is not secured to any of walls 206, 208, 210, 212 of box 204 and instead is freely movable within box 204. Member 238 defines an opening (similar to opening 118 in member 86 illustrated in FIGS. 1–3) configured to receive guide member 236. Although the opening is round in the illustrated embodiment and therefore shaped to received guide member 236, it should be understood that member 238 and the opening could be sized differently or have different shapes so long as the two are complementary to one another. The use of a round member 236 and opening, however, is advantageous because it allows some degree of relative rotation between the male and female guide members 236, 238. It should also be understood that member 238 may be eliminated and that member 236 and bracket 202 could alone form means for limiting lateral movement while permitting vertical movement of bodies 224, 226 and axle beam 52 relative to frame rails 18, 20. For example, the shape of member 236 could be made complementary to the shape of side walls 210, 212 of bracket 202 (i.e., rectilinear). Such an embodiment would, however, prevent relative rotation of member 236 relative to bracket 202.

Snap rings 240, 242 limit movement of guide member 236 in the fore-aft direction. Snap rings 240, 242 are received in circumferential grooves proximate each end of member 236 and abut against the forward and rearward sizes of legs 250, 252, respectively. Although snap rings 240, 242 are used in the illustrated embodiment, it should be understood that a variety of other structures could be used to provide a diameter to member 236 greater than the apertures in legs 250, 252 and thereby prevent fore-aft movement of member 236.

The combination of male guide member 236 and female guide member 238, along with bracket 202, provides lateral stability to axle assembly 12. Movement of guide 238, suspension 200, and axle assembly 12 in a transverse or lateral direction is limited by walls 210, 212 of bracket 202. Member 238, suspension 200 and axle assembly 12, however, are relatively free to move in the fore-aft direction because of the forward and rear openings in bracket 202 and in the vertical direction because of the spacing of top and bottom walls 206, 208 of bracket 202. Walls 206, 208 of bracket 202 can further be used to limit this vertical motion to a predetermined range. Although the illustrated embodiment uses both male and female guide members 236, 238, it should again be understood that member 238 could be removed without departing from the spirit of the present invention. In this case, member 236 could, for example, be made larger and a wear material applied to either member 236 or walls 206, 208, 210, 212 of box 204 such that member 236 is received within aperture 214 and still limited in its lateral movement, but retains relative freedom of motion in the fore-aft and vertical directions as well as freedom to rotate within aperture 214.

Springs 244, 246 are provided to dampen movements between steer axle assembly 12 and frame 10. Springs 244, 246 are conventional in the art and may comprise an air spring supported between opposed seats defined on arms 232, 234 of suspension 200 and brackets 30, 32 on frame 10.

While the invention has been shown and described with reference to one or more particular embodiments thereof, it will be understood by those of skill in the art that various changes and modifications can be made without departing from the spirit and scope of the invention. For example, it should be understood that the configuration of bracket 34, arm 82, and guide member 86 or bracket 202 and guide members 236, 238 could be replicated on each side of the vehicle frame 10.

We claim:

1. A suspension for coupling a steer axle assembly to a vehicle frame having first and second longitudinal frame rails, comprising:
   a body coupled to an axle beam of said steer axle assembly;
   a first arm extending from said body, said first arm comprising a leaf spring sandwiched between said body and said axle beam, said first arm defining an eye at one end through which said first arm is coupled to said frame at said one end and pivotable about a pivot axis disposed proximate said one end and extending transversely to said first and second longitudinal frame rails; and,
   a second arm extending from said body in a substantially opposite direction from said first arm, said second arm forming a unitary structure with said body and defining a first guide member received within an aperture defined by a bracket of said frame wherein said aperture is configured to limit lateral movement of said first guide member and said axle beam relative to said first and second longitudinal frame rails, but allow vertical movement of said first guide member and said axle beam relative to said first and second longitudinal frame rails.

2. The suspension of claim 1, further comprising a spring disposed between said second arm and said frame.

3. The suspension of claim 1, further comprising a shock absorber having an eye supported on a rod extending from said second arm.

4. The suspension of claim 1 wherein said bracket and said first guide member are disposed at least partially above said axle beam.

5. The suspension of claim 1 wherein said bracket and said first guide member are disposed on one side of said axle beam.

6. A suspension for coupling a steer axle assembly to a vehicle frame having first and second longitudinal frame rails, comprising:
   a body coupled to an axle beam of said steer axle assembly;
   a first arm extending from said body, said first arm coupled to said frame at one end and pivotable about a pivot axis disposed proximate said one end and extending transversely to said first and second longitudinal frame rails;
   a first guide member connected to said body and received within an aperture defined by a bracket of said frame, said body not extending through said aperture, wherein said aperture is configured to limit lateral movement of said first guide member and said axle beam relative to said first and second longitudinal frame rails, but allow vertical movement of said first guide member and said axle beam relative to said first and second longitudinal frame rails; and,
   a spring disposed between said axle beam and said frame and supported by a spring seat defined by said body.

7. A suspension for coupling a steer axle assembly to a vehicle frame having first and second longitudinal frame rails, comprising:
   a body coupled to an axle beam of said steer axle assembly;
   a first arm extending from said body, said first arm coupled to said frame at one end and pivotable about a pivot axis disposed proximate said one end and extending transversely to said first and second longitudinal frame rails;
   a first guide member connected to said body and received within an aperture defined by a bracket of said frame wherein said aperture is configured to limit lateral movement of said first guide member and said axle beam relative to said first and second longitudinal frame rails, but allow vertical movement of said first guide member and said axle beam relative to said first and second longitudinal frame rails; and,
   a second guide member disposed within said aperture in said bracket, said second guide member defining an opening configured to receive said first guide member.

8. The suspension of claim 7 wherein said first guide member is rotatable within said second guide member.

9. The suspension of claim 7, further comprising means for limiting fore-aft movement of said first guide member relative to said second guide member.

10. The suspension of claim 7 wherein said limiting means includes a snap ring disposed within a groove in said first guide member.

11. A suspension for coupling a steer axle assembly to a vehicle frame having first and second longitudinal frame rails, comprising:
   a body coupled to an axle beam of said steer axle assembly;
   a first arm extending from said body, said first arm coupled to said frame at one end and pivotable about a pivot axis disposed proximate said one end and extending transversely to said first and second longitudinal frame rails; and,
   a first guide member connected to said body and received within an aperture defined by a bracket of said frame wherein said aperture is configured to limit lateral movement of said first guide member and said axle beam relative to said first and second longitudinal frame rails, but allow vertical movement of said first guide member and said axle beam relative to said first and second longitudinal frame rails wherein said first guide member is rotatable within said aperture of said bracket.

12. A suspension for coupling a steer axle assembly to a vehicle frame having first and second longitudinal frame rails, comprising:

a body coupled to an axle beam of said steer axle assembly;

a first arm extending from said body, said first arm coupled to said frame at one end and pivotable about a pivot axis disposed proximate said one end and extending transversely to said first and second longitudinal frame rails; and, a first guide member connected to said body and received within an aperture defined by a bracket of said frame wherein said aperture is configured to limit lateral movement of said first guide member and said axle beam relative to said first and second longitudinal frame rails, but allow vertical movement of said first guide member and said axle beam relative to said first and second longitudinal frame rails wherein said body includes first and second legs disposed on opposite sides of said bracket and configured to receive said first guide member.

13. The suspension of claim 12, further comprising means for limiting fore-aft movement of said first guide member.

14. The suspension of claim 13 wherein said limiting means includes a snap ring disposed about said first guide member and abutting one of said first and second legs.

15. A suspension for coupling a steer axle assembly to a vehicle frame having first and second longitudinal frame rails, comprising:

a body coupled to an axle beam of said steer axle assembly; and, a first arm extending from said body, said first arm coupled to said frame at one end and pivotable about a pivot axis disposed proximate said one end and extending transversely to said first and second longitudinal frame rails; and, means for limiting lateral movement while permitting vertical movement of said body and said axle beam relative to said first and second longitudinal frame rails wherein said means for limiting lateral movement while permitting vertical movement includes:

a bracket connected to one of said first and second longitudinal frame rails and defining an aperture;

a male guide member coupled to said body and configured to be received within said aperture; and, a female guide member disposed within said aperture, said female guide member fixed against rotation relative to said bracket and defining an opening, said male guide member received within said opening in said female guide member and rotatable relative to said bracket and said female guide member.

* * * * *